(12) United States Patent
Belew et al.

(10) Patent No.: US 7,008,542 B2
(45) Date of Patent: Mar. 7, 2006

(54) METHOD FOR MIXED MODE ADSORPTION

(75) Inventors: Makonnen Belew, Uppsala (SE);
Bo-Lennart Johansson, Uppsala (SE);
Jean-Luc Maloisel, Uppsala (SE)

(73) Assignee: Amersham Biosciences AB, Uppsala (SE)

( * ) Notice: Subject to any disclaimer, the term of this patent is extended or adjusted under 35 U.S.C. 154(b) by 173 days.

(21) Appl. No.: 10/451,192

(22) PCT Filed: Dec. 17, 2001

(86) PCT No.: PCT/EP01/14895

§ 371 (c)(1),
(2), (4) Date: Jun. 19, 2003

(87) PCT Pub. No.: WO02/053252

PCT Pub. Date: Jul. 11, 2002

(65) Prior Publication Data
US 2004/0020857 A1  Feb. 5, 2004

(30) Foreign Application Priority Data
Dec. 31, 2000  (SE) .................................. 0004932

(51) Int. Cl.
*B01D 15/00* (2006.01)
(52) U.S. Cl. ...................... 210/660; 210/681; 210/683; 210/685; 210/686
(58) Field of Classification Search ................ 210/660, 210/681, 683, 685, 686
See application file for complete search history.

(56) References Cited

U.S. PATENT DOCUMENTS 6,090,288 A   7/2000  Berglund et al.

FOREIGN PATENT DOCUMENTS

| EP | 0 276 138 | 7/1988 |
|---|---|---|
| WO | WO96/09116 | 3/1996 |
| WO | WO99/65607 | 12/1999 |
| WO | WO00/69872 | 11/2000 |
| WO | WO01/38228 | 5/2001 |

OTHER PUBLICATIONS

Bischoff, R., et al., "Isolation of Specific TRNAS using an Ionic-hydrophobic Mixed-Mode Chromatographic Matrix" Analytical Biochemistry, Orlando, Florida, USA vol. 151, 1985 pp. 526-533.

McLaughlin, L. W. "Mixed-mode chromatography of nucleic acids" Chemical Reviews, American Chemical Society, Easton, USA vol. 89, 1989, pp. 309-319.

*Primary Examiner*—Chester T. Barry

(74) *Attorney, Agent, or Firm*—Royal N. Ronning, Jr.; Yonggang Ji

(57) ABSTRACT

Method for the removal of a substance from an aqueous liquid by ion exchange comprising providing a liquid with said substance is present; providing an adsorption matrix which comprises at least two different ligands; contacting the liquid with the matrix under a period of time and conditions sufficient to allow adsorption of the substance to the matrix; and adding an eluent that desorbs the substance from the matrix. Each one of the ligands interacts with the substance during the adsorption step, and at least one of the ligands is charged and capable of ionic interaction with the substance. The method can be run as a cation or anion exchange. The substance desorption can be performed by adding an eluent comprising an increasing ionic strength. The invention also encompasses an adsorbent comprising at least two structurally different ligands, which interact with the same kind of substance when used in a separation procedure.

16 Claims, No Drawings

METHOD FOR MIXED MODE ADSORPTION

FIELD OF INVENTION

The present invention relates to a method for the removal of a substance that carries a charge and is present in an aqueous liquid (I). The method comprises the steps of:
(i) contacting the liquid with an ion-exchange adsorbent (1) under conditions permitting binding between the adsorbent and the substance, and
(ii) desorbing said substance from the adsorbent by the use of a liquid (II), The invention also relates to novel ion-exchange adsorbents that may be used in the novel and innovative method.

An adsorbent of this invention contains two or more different ligands that are coupled on the same base matrix. The ligands are different with respect to functionality and/or structural elements. The terms "a mixed mode ligand" and "a bimodal ligand" refer to a ligand that is capable of providing at least two different, but co-operative, sites which interact with the substance to be bound. The sites are different with respect to functionality and/or kind.

The charged substance typically is bio-organic and/or amphoteric. With respect to the number of charged groups in the substance, the greatest advantages are obtained if there are two or more charged groups, such as one, two, or more positively charged groups and/or one, two or more negatively charged groups. With respect to the molecular weight of the substances the greatest advantages are achieved if the molecular weight is above 1,000 Dalton, such as above 5,000 Dalton or above 10,000 Dalton.

BACKGROUND TECHNOLOGY

The method defined above includes chromatographic procedures that use monolithic or particle adsorbents in the form of packed or fluidised beds, and batch-wise procedures that typically include only particle adsorbents. Monolithic adsorbents include porous membranes, porous plugs and also tube walls and other forms of integral matrices. The purpose of the procedures may be to purify the substance carrying the charge, in which case the substance becomes bound to the adsorbent during step (i), and, if necessary, is further purified subsequent to desorption from the adsorbent. Another purpose is to remove the substance from liquid (I) because it is an undesired component therein. In this latter case, the liquid may be further processed after step (i). In both cases and if so desired, the adsorbent may be reused after desorption of the bound substance.

Other uses are assay procedures involving determination of either the substance carrying the charge or of a substance remaining in liquid (I).

There are a number of publications, which describe adsorbents that are functionalized with more than one kind of ligand.

WO 9600735, WO 9609116 and U.S. Pat. No. 5,652,348 (Burton et al) disclose separation methods and media based on hydrophobic interaction. In one embodiment the media may contain both ionizable and non-ionizable ligands. The main idea is that loading is done under conditions promoting hydrophobic interaction (neutral hydrocarbon ligands) and desorption by a pH switch in order to charge ligands with an opposite charge compared to the adsorbed protein (repulsion). Thus, WO 00/69872 utilises two ligands on the matrix, one of which is interacting with a nucleic acid during adsorption and the other one of which is utilised for desorption thereof by repulsion of the nucleic acid.

Burton et al., Biotechnology and Bioengineering 56(1) (1997) 45–55 describe attempts to purify chymosin on adsorbents comprising
(a) aromatic hydrocarbon ligands that are chargeable but essentially uncharged during adsorption (secondary amine/ammonium), or
(b) an unchargeable aromatic ligand plus a separate cation-exchange ligand corresponding to the unreacted spacer (—COO$^-$/COOH) (which has been used to introduce the aromatic ligand).

Issaq et al., J. Liq. Chromatog. 11(14) (1988) 2851–2861; Floyd et al., Anal. Biochem. 154 (1986) 570–577; and Buzewski et al J. Liq. Chrom. & Rel. Technol. 20(15) (1997) 2313–2325 describe chromatographic properties of silica particles derivatized with two kinds of ligands (an ion-exchange ligand and a hydrophobic (alkyl) interaction ligand)

Teichberg, J. Chromatog. 510 (1990) 49–57 describes affinity repulsion chromatography in which a positively charged ligand is interacting with a neutral affinity ligand on an adsorbent that in addition also carries a positively charged repulsion ligand.

WO 9839094 (Amersham Pharmacia Biotech AB) and WO 9839364 (Amersham Pharmacia Biotech AB) disclose as one embodiment beads in which there is one kind of charged ligands in a surface layer while the interior of the beads is functionalised with ligands of the opposite charge. The beads are suggested for the adsorption of biomolecules.

It is known that the introduction of affinity ligands on separation matrices often introduces more than one kind of groups and/or residual groups due to inefficiencies in the coupling reaction. Reaction of N,N-diethyl aminoethyl chloride with polysaccharide matrices, for instance, typically introduces (a) ligands only containing one tertiary ammonium group together with (b) ligands containing both tertiary and quaternary ammonium groups. To our knowledge unusual high breakthrough capacities at ion-exchange conditions comprising high salt concentrations have never been reported for this type of conventional ion-exchangers. Compare Burton et al., Biotechnology and Bioengineering 56(1) (1997) 45–55

THE OBJECTIVES OF THE INVENTION

The objectives of the present invention are:
a) to achieve adsorption/binding of charged substances, such as proteins, to adsorbents having ion-exchange ligands at relatively high ionic strengths;
b) to provide ion-exchange media that can have a reduced ligand content while retaining a sufficient capacity to bind target substances;
c) to enable elution/desorption within broad ionic strength intervals of substances adsorbed/bound to an ion-exchanger, i.e. to increase the selectivity;
d) to design ion-exchangers which have high breakthrough capacities (typically >2 mg/ml wet gel, 10% breakthrough in the flow through at 300 cm/h), good recovery of proteins (often 95% or higher) etc;
e) to design ion-exchangers that are binding by ion-exchange at high salt concentration and that can withstand regeneration and/or cleaning with alkaline (pH$\geq$13) and or acidic solutions (pH$\leq$3) without significant loss of chromatographic properties;

f) to obviate extensive dilutions of samples of relatively high ionic strength that are to be used in processes requiring a lowered ionic strength;

g) to provide simplified desalting procedures;

h) to provide simplified processes involving ion-exchangers, for instance to improve productivity and/or reduce the costs for process equipment and investments;

i) to provide ion-exchangers that are adapted to preparative applications, for instance in large scale processes in which a sample volume (=liquid (I)) larger than a liter is applied and processed on an ion-exchanger;

j) to provide opportunities for novel combinations of separation principles based on elution of ion-exchanger adsorbents at high salt concentration, for instance hydrophobic interaction adsorption after an ion-exchange step.

One or more of these objectives are based on the recognition that ion-exchangers adsorbing at relatively high salt concentrations and at relatively high ionic strengths have benefits. This is contrary to traditional ion-exchangers, which have utilised high salt concentrations, and high ionic strengths primarily to achieve desorption.

SUMMARY OF THE PRESENT INVENTION

One or more of the objectives described above can be reached by using a method as defined in the appended claims. Thus, the present invention relates to a method for the removal of a substance from an aqueous liquid by ion exchange, said method comprising the steps of:
  providing a liquid wherein said substance is present in a charged state;
  providing an adsorption matrix which comprises at least two structurally different ligands, comprising at least one weak ion exchanger or at least one strong ion exchanger;
  contacting the liquid with the matrix under a sufficient period of time to allow adsorption of the substance to the matrix; and
  adding an eluent that desorbs the substance from the matrix;
wherein each ligand interacts with the substance during the adsorption step and at least one of said ligands is charged and capable of ionic interaction with the substance.

Accordingly, the present invention uses two ligands that both actively interacts with the substance of interest during the adsorption, as compared to WO 00/69872, wherein two ligands are used but only one is active to adsorb a nucleic acid.

Furthermore, since the present invention utilises mainly ionic-interactions the present method differs also from the above discussed WO 96/09116, wherein hydrophobic interactions are utilised. Even though experiments in said WO 96/09116 test several ligands using the same conditions, each one was tested alone and not in combination and therefore only one ligand adsorbents are suggested therein. Furthermore, the elution of this reference is performed by a decrease of salt concentration, as is typically the case with hydrophobic interaction chromatography. Contrary, the present invention can utilise an increase in salt concentration for elution, which indicates that the main interaction of the present adsorption is of ionic type.

In one embodiment, at least one charged ligand is an anion exchanger and the substance to be removed is initially negatively charged, the conditions for adsorption being defined by a pH>pI of the negatively charged substance and pH<pKa of the positively charged groups of the ligand. An advantage with the present invention is that the adsorption efficiency thereof has been shown to be unexpectedly high. Thus, the adsorption capacity for the negatively charged substance is as high as ≧100%, and even ≧200%, of the adsorption capacity of the same substance in a corresponding reference ion-exchanger in which essentially all of the charged groups are quaternary ammonium groups (q-groups).

In another embodiment, at least one charged ligand is a cation ion exchanger and the substance to be removed is initially positively charged, the conditions for adsorption being defined by a pH<pI of the positively charged substance and pH>pKa of the negatively acid corresponding to the ligand. Here the adsorption capacity for the substance is as high as ≧100%, and even ≧200%, of the adsorption capacity of the same substance in a corresponding reference ion-exchanger in which essentially all charged groups are sulfopropyl group.

In the present context, it is to be understood that adsorption capacity refers to the same variable as breakthrough capacity, which is sometimes used in the present application. A dynamic adsorption capacity refers to the capacity in a chromatographic procedure, wherein the aqueous liquid is brought to pass the adsorbent. Similarly, a static adsorption capacity is used in the context of a batch procedure.

In one embodiment of the present method, the adsorption is performed at an ionic strength higher than or equal to that of a water solution of 0.10 M NaCl, preferably 0.20 M NaCl or 0.30 M NaCl.

In another embodiment, the ligands can be characterised by being capable of binding the substance of interest in an aqueous reference liquid at an ionic strength corresponding to 0.25 M NaCl.

In a specific embodiment, at least one ligand interacts with the substance by hydrophobic and/or electron donor-acceptor interaction. Said ligand is preferably chargeable and desorption of the substance from the matrix is performed by a pH switch.

In yet another embodiment of the present method, the polarity of the eluent is lower than that of the aqueous liquid from which the substance is removed.

In an advantageous embodiment, the present method is for removal of a biopolymer structure from a liquid, which structure is selected from the group comprised of carbohydrate structures, peptide structures, peptide nucleic acid (PNA) structures and nucleic acid structures. In a specific embodiment, the method is for removal of a biopolymer the charge of which is pH-dependent.

The present method can also be used for removal of an amphoteric substance.

The present invention also relates to an adsorbent suitable for use in the method according to the invention, which comprises at least two ligands and wherein at least one ligand is a mixed mode ligand. Such a mixed mode ligand will comprise
  (a) a first mode site which gives charge-charge attractive interaction with the substance, and
  (b) a second mode site which gives charge-charge attractive interaction and/or hydrophobic interaction and/or electron donor-acceptor interaction with the substance.

In one embodiment, the present adsorbent comprises a first and a second ligand comprising at least one functional group that participates in electron donor-acceptor interaction with the substance to be separated, which functional group is selected from the group comprised of:

(i) donor atoms/groups such as:
  a oxygen with a free pair of electrons, such as in hydroxy, ethers, nitro, carbonyls, such as carboxy, esters (—O— and —CO—O—) and amides,
  sulphur with a free electron pair, such as in thioethers (—S—),
  nitrogen with a free pair of electron, such as in amines, amides including sulphone amides,
  halo (fluorine, chlorine, bromine and iodine), and
  sp- and $sp^2$-hybridised carbons, or
(ii) acceptor atoms/groups, i.e. electron deficient atoms or groups, such as metal ions, cyano, nitrogen in nitro, hydrogen bound to an electronegative atom as for instance in HO— (hydroxy, carboxy etc), —NH— (amides, amines etc), HS— (thiol etc) etc.

In one embodiment, the ratio between the degrees of substitution for any pair of the sets in the adsorbent is within 0.02–50. In one embodiment, the first and the second ligands have been introduced so that they occur essentially at random in relation to each other, at least in a part of the support matrix.

The First Aspect of the Invention

Below, the present invention will be described in more detail with reference to numbered steps to facilitate the understanding and to further Illustrate various embodiments. Thus, the present inventors have discovered that one or more of the objectives above can be met by the process defined in the introductory part, if the ion-exchange adsorbent (1) is selected amongst ion-exchange adsorbents that are characterised by comprising a base matrix which is functionalised with at last two different ligands (ligand 1, ligand 2) for which
  (a) at least one of the ligands has a charge which is opposite to a charge present on the substance under the conditions provided by liquid (I),
  (b) each ligand is capable of interacting with the substance for binding under the conditions provided by liquid (I).

The interaction is either in an independent or in a co-operative fashion in relation to any of the other ligands.

The molecular weights of the typical ligands contemplated in the context of the instant invention <1000, such as <700 Dalton. The molecular weight contributions of halogens that may be present are not included in these ranges.

Ligand 1 is a charged ligand, i.e. is selected from single and mixed mode ligands carrying a charge under the conditions provided in step (i) (the first category).

Ligand 2 is a ligand that is of a different kind compared to ligand 1, for instance
  (a) is capable of interacting in a way that does not involve charge-charge attractive interaction (second category), i.e. ligands that are uncharged under the conditions provided in step (i), or
  (b) has a charge that enables interaction via charge-charge interaction but is of a different kind compared to ligand, i.e. is selected from the first category.

For (a) the interaction may involve van der Waals interaction, hydrophobic interaction and/or electron donor-acceptor interaction.

Another characteristic feature of ion-exchange adsorbents that are to be used in the inventive method is that the combination of ligands has been selected (according to type and degrees of substitution) such that the adsorbent:
  (A) is capable of binding the substance of interest in an aqueous reference liquid at an ionic strength corresponding to 0.25 M NaCl; and
  (B) permits in the subinterval of the pH interval 2–12, where the substance has said charge, a maximal breakthrough capacity for the substance ≧100%, such as ≧200% or ≧300% or ≧500% or ≧1000%, of the breakthrough capacity of the substance for
    (a) the corresponding anion-exchanger (adsorbent 2a) in which essentially all charged ligands are Q-ligands; or
    (b) the corresponding cation-exchanger (adsorbent 2b) in which essentially all charged ligands are SP-ligands.

By the term "SP groups" is meant sulphopropyl groups that can be obtained by reacting an allyl group with bisulphite, i.e. SP groups include —$CH_2CH_2CH_2SO_3^-$ and its sulphonic acid isomers.

By the term "Q groups" is meant quaternary ammonium groups that can be obtained by reacting —$OCH_2CH(OH)CH_2OCH_2CH=CH_2$ with halogen followed by reaction with trimethylamine, i.e. Q-groups include —$OCH_2CH(OH)CH_2OCH_2CH(OH)CH_2N+(CH_3)_3$ and its isomers containing a quaternary trimethylammonium group.

Adsorbent 2a is used when the charge on the substance is negative and adsorbent 2b when the charge on the substance is positive. The aqueous reference liquid in contains NaCl, buffer and the substance of interest carrying the charge.

The comparisons above refer to measurements performed under essentially the same conditions for ion-exchanger (1) and (2a) and for ion-exchanger (1) and (2b), i.e. pH, temperature, solvent composition, flow velocity etc are the same between (1) and (2a) and between (1) and (2b). The breakthrough capacities are measured at the same relative concentration of the substance in the flow through (for instance $c/c_0=10\%$ at a flow velocity of 300 cm/h, for $c/c_0$ see the experimental part).

The "corresponding anion-exchanger/cation-exchanger" means that the support matrix is the same, i.e. support material, bead size, pore sizes, pore volume, packing procedure etc are the same. The total degree of substitution for charged ligand(s) of ion-exchanger 1 is/are essentially the same as on the reference ion-exchanger (2a or 2b) (measured as chloride and sodium ion capacity, respectively). The counter-ion should also be the same. The spacer and coupling chemistry may differ. Certain kinds of coupling chemistries may lead to cross-linking of the support matrix resulting in a more rigid matrix. In this case the flow conditions at which the comparison is made is selected at a level where the matrix is essentially non-compressed.

Typically a useful breakthrough capacity for the substance is higher than the maximal breakthrough capacity the substance has on
  (a) the commercially available anion-exchanger Q-Sepharose Fast Flow (Amersham Pharmacia Biotech, Uppsala, Sweden) which has a chloride ion capacity of 0.18–0.25 mmol/ml gel and/or
  (b) the commercially available anion-exchanger SP-Sepharose Fast Flow (Amersham Pharmacia Biotech, Uppsala, Sweden) which has a sodium ion capacity of 0.18–0.25 mmol/ml gel.

The base matrix in these two reference ion-exchangers is epichlorohydrin cross-linked agarose in beaded form. The beads have diameters in the interval 45–165 µm. The exclusion limit for globular proteins is $4 \times 10^6$.

From a practical point of view the above means that the breakthrough capacity for the substance at issue should be >2 mg/ml of wet gel, such as >4 mg/ml of wet gel, for a breakthrough of 10% at a flow velocity of 300 cm/h and at 0.25 M NaCl.

Breakthrough capacities refer to measurements made at room temperature, i.e. about 25° C.

Ligands that are introduced by the use of the same reagent and conditions, for instance in parallel during the same conditions, are considered to be of the same kind even if they are structurally different. This in particular applies if the formed ligands are isomers.

Ligands that are residual groups (unreacted groups) even after the use of large excesses of derivatizing reagents in order to minimise these groups are considered non-existent. Typically this type of groups is present in molar amounts less than 10% such as less than 5% compared to the starting amount of the group to be derivatised.

The molar ratio between different ligands is typically in the interval of 0.01–100, often with preference for the interval 0.02–50.

First Category: Single and Mixed Mode Ligands Carrying a Charge Under the Conditions Provided in Step (i).

The ligands of this category differ with respect to the charged atom or group and/or one or more of the closest 1–7 atoms, such as the closest 1–3 atoms:
  (a) different nitrogens that are positively charged; for instance primary ammonium, secondary ammonium, tertiary ammonium, quaternary ammonium and amidinium;
  (b) different sulphurs that are positively charged, for instance sulphonium,
  (c) different oxygens that are negatively charged, for instance in groups such as carboxylate ($-COO^-$), phosphonate or phosphate ($-PO_3^{2-}$, $-P(OH)O_2^-$, and $-OP(OH)O_2^-$, $OPO_3^{2-}$ respectively), sulphonate or sulphate ($-SO_3^-$ and $-OSO_3^-$ respectively), -aryl-$O^-$ (phenolate/arylolate) etc.

The free bond (valence) binds directly to a carbon that is part of a chain attaching the group to the base matrix.

The concept of different kinds of charged ligands also includes the differences:
  (i) the charged atom of (a) and/or (b) above are part of a linear or cyclic structure, or that a cyclic structure is aromatic or non-aromatic and/or comprises a 4-, 5-, 6-, 7-, 8- etc membered ring,
  (ii) the chain linking a charged atom of (a) or (b) above or the charged group of (c) above, next to these atoms/groups has a part of 1–3 atoms that differs with respect to type of carbon atoms and/or heteroatoms
  (iii) the ligand is a single or mixed mode ligand.

The difference outlined in (ii) includes that all or a portion of the carbon atoms are/is selected amongst $sp^3$-, $sp^2$- and sp-hybridised carbons or that a heteroatom selected from thioether sulphur, ether oxygen and halogen may or may not be present.

Ligands may differ with respect to pKa-values. Relevant differences are typically $\geq 0.5$ pH units, such as $\geq 1$ or $\geq 2$ pH units.

Ligands that have a pH-dependent charge exist in an acid form and a base form. The following applies for ion-exchange ligands that have a pH-dependent charge:
  a) Both of the ion-exchange ligand and its corresponding base is considered being ligands of the same kind as long as pH of liquid (I) is $\leq pKa+2$.
  b) Both of the ion-exchange ligand and its corresponding acid is considered being ligands of the same kind as long as the pH of liquid (1) is $\geq pKa-2$.

pKa stands for the pKa of (a) the ligand (alternative a) or the acid corresponding to the ligand (alternative b). If the pH of liquid (I) does not comply with these criteria the charged form of the ligand is present in non-essential amounts.

The term "a single mode charged ligand" contemplates that the chain linking the charged atom (a or b above) or the charged group (c above) to the base matrix consists of atoms selected from $sp^3$-hybridised carbons and single ether oxygen within 7 atoms' distance from such an atom or group. Other groups attached to the chain are primarily hydrogens and/or hydroxy, and possibly also methyl and methoxy. A positive nitrogen atom binds other groups, e.g. selected amongst hydrogen and/or lower alkyls ($C_{1-5}$), such as methyl or ethyl. For a positively charged sulphur atom these additional groups are primarily selected amongst lower alkyls ($C_{1-5}$), such as methyl or ethyl.

The term "a mixed mode charged ligand" contemplates that the ligand within a distance of 7 atoms from the charged atom (a or b above) or from the charged group (c above) has one, two or more atoms or groups that are able to participate in hydrophobic interactions and/or electron-donor acceptor interactions as defined above, with the proviso that these atoms or groups are not a single ether oxygen, a single hydroxy or $sp^3$-carbons. Typically the distance is 1, 2, 3, 4 atoms.

Hydrophobic interaction includes the interaction between a pure hydrocarbon group of a ligand and a hydrophobic or lipid-like group in a substance. Suitable pure hydrocarbon groups comprise 2, 3, 4, 5, 6 or more carbon atoms (pure alkyl, pure aryl, pure aralkyl, pure alkylaryl, pure alkenyl, pure alkynyl etc and corresponding groups comprising two or more free bonds (valencies)). Van der Waals interaction may be a significant part of hydrophobic interactions.

Electron donor-acceptor interaction includes interactions such as hydrogen-bonding, $\pi$-$\pi$, charge transfer, etc. Electron donor-acceptor interactions mean that an electronegative atom with a free pair of electrons acts as a donor and bind to an electron-deficient atom that acts as an acceptor for the electron pair of the donor.

See Karger et al., "An Introduction into Separation Science", John Wiley & Sons (1973) page 42 for a discussion about electron donor acceptor interactions.

Illustrative examples of donor atoms/groups are:
  (a) oxygen with a free pair of electrons, such as in hydroxy, ethers, carbonyls, and esters ($-O-$ and $-CO-O-$) and amides,
  (b) sulphur with a free electron pair, such as in thioethers ($-S-$),
  (c) nitrogen with a free pair of electron, such as in amines, amides including sulphone amides, carbamides, carbamates, amidines etc, cyano,
  (d) halo (fluorine, chlorine, bromine and iodine), and
  (e) sp- and $sp^2$-hybridised carbons.

Typical acceptor atoms/groups are electron deficient atoms or groups, such as metal ions, cyano, nitrogen in nitro etc, and include also a hydrogen bound to an electronegative atom such as HO— in hydroxy and carboxy, —NH— in amides and amines, HS— in thiol etc.

Donor and acceptor atoms or groups may be located in the chain linking the charged atom or the charged group to the base matrix,
a branch attached to said chain or
a separate substituent directly attached to the charged atom of or group (in particular for anion-exchange groups/ligands.

An electron donor/acceptor atom or group may be present in a branch attached to the chain linking the ligand to the base matrix and at a distance of 7 or more atoms from the charged atom or charged group. In such a case the complete branch is considered as a separate ligand.

Particularly interesting mixed mode charged ligands have a thioether (—S—) and/or a $sp^2$-hybridised carbon, such as an aromatic carbon, within the above-mentioned distances of the charged atoms or groups. See for instance our copending International Patent Applications PCT/EP00/11605 (Amersham Pharmacia Biotech AB) and PCT/EP00/11606 (Amersham Pharmacia Biotech AB) (both of which refer to anion-exchange ligands), and SE 0002688-0 filed Jul. 17, 2000 (cation-exchange ligands) and WO 996507 (Amersham Pharmacia Biotech AB) (cation-exchange ligands). WO 9729825 (U.S. Pat. No. 6,090,288) (Amersham Pharmacia Biotech AB) discloses mixed mode anion-exchange ligands which have one or more hydroxy and/or amino/ammonium nitrogen at a position 2–3 carbon from a primary, secondary or tertiary ammonium nitrogen. Mixed mode ion-exchange ligands that are potentially useful in the instant innovative method are described in WO 9808603 (Upfront Chromatography), WO 9600735, WO 9609116 and U.S. Pat. No. 5,652,348 (Burton at al). All the publications referred to in this paragraph are incorporated by reference.

In the thioethers (—S—) contemplated above, each of the free bonds (valences) binds to a $sp^2$- or $sp^3$-hybridised carbon which may or may not be part of a cyclic structure that may or may not be aromatic or non-aromatic. The term "thioethers" as contemplated herein thus comprises thiophene and other heteroaromatic rings comprising sulphur as a ring atom.

There may also be a pure hydrocarbon group of the alkyl type comprising 3, 4, 5 or more carbon atoms within the above-mentioned distances.

The aromatic ring structure contemplated above may comprise one or more aromatic rings, for instance a phenyl, a biphenyl or a naphthyl structure and other aromatic ring systems that comprise fused rings or bicyclic structures. Aromatic rings may be heterocyclic, i.e. contain one or more nitrogen, oxygen or sulphur atoms, and may have substituents. These other substituents may contain an electron donor or acceptor atom or group, for instance enabling hydrogen-bonding and/or other electron donor-acceptor Interactions. Illustrative aromatic ring structures are: hydoxyphenyl (2-, 3- and 4-), 2-benzimadozolyl, methylthioxyphenyl (2-, 3- and 4-), 3-indolyl, 2-hydroxy-5-nitrophenyl, aminophenyl (2-, 3- and 4-), 4-(2-aminoethyl) phenyl, 3,4-dihydroxyphenyl, 4-nitrophenyl, 3-trifluoromethylphenyl, 4-imidazolyl, 4-aminopyridine, 6-aminopyrimidyl, 2-thienyl, 2,4,5-triaminophenyl, 4-aminotriazinyl-, 4-sulphoneamidophenyl etc.

The pKa of the preferred anion-exchange ligands and of the corresponding acids for the preferred cation-exchange ligands can be found in the interval from 3 and upwards and is preferably below 11, preferably in the interval of 4–9 in order to permit appropriate decharging of the ion-exchange ligand.

Particularly interesting anion-exchange ligands have a pH dependent charge and have pKa values that are $\leq 12.0$, such as $\leq 10.5$. This means that these ligands comprise a charged group, which preferably is selected amongst primary or secondary ammonium groups or tertiary ammonium groups. Tertiary ammonium groups in which the nitrogen is part of an aromatic structure and ammonium groups having an aromatic carbon in its α- or β-position may have pKa values below 8. Normally the pKa of anion-exchange ligands is $\geq 3$, such as $\geq 4$.

Particularly interesting negatively charged ligands carry a pH-dependent charge. The pKa-values for the corresponding acids normally are $\geq 3$, such as $\geq 4$. These kind of ligands thus should comprise charged groups selected amongst carboxylate (—COO$^-$), phosphonate or phosphate (—PO$_3^{2-}$, —P(OH)O$_2^-$, and —OP(OH)O$_2^-$, —OPO$_3^{2-}$ respectively), -aryl-O$^-$ (phenolate/aryloate) and other weak acid groups.

This does not exclude that ion-exchanging ligands corresponding to
strong acids (pKa$\leq 3$, such as $\leq 2$ or $\leq 0$) (the corresponding base acts as a cation-exchange ligand), and
weak acids (pKa$\geq 10$, such as $\geq 12$, etc) or ligands carrying a charge that is independent of pH will also have advantages when they are incorporated in an ion-exchanger that is to be used in our new and innovative desalting method. As for the other ion-exchanging groups, these advantages are dependent on the properties of the particular substance to be desalted, for instance its isoelectric point and the strength of its interaction with the ion-exchanger.

The pKa-value of a ligand is taken as the pH at which 50% of the ligand in question are titrated.

Second Category: Ligands that are Uncharged Under the Conditions Provided in Step (i) but Capable of Interacting with the Desired Charged Substance.

There are mainly two kinds of uncharged ligands:
(a) ligands that can be charged by a pH-switch (class I) and
(b) ligands that can not be charged by a pH switch (class II).

Class I comprises uncharged forms of ligands that can have a pH-dependent charge. See above.

A Class II ligand contains one or more structural elements that can give rise to hydrophobic interactions and electron donor-acceptor interactions as discussed above. In a typical class II ligand there are two, three, four or more electron donor-acceptor atoms or groups as defined above. Each of the atoms or groups is separated from other electron donor acceptor atoms or groups by two, three, four or more $sp^3$-hybridised carbon atoms linked directly to each other.

A ligand of class II is defined as the outermost part of a group that is projecting from the base matrix and complies with the definition in the preceding paragraph. By the is term "outermost" is contemplated atoms that are at 1–7 atoms' distance from the outermost atom that is capable of participating in electron donor-acceptor interactions or in hydrophobic interactions involving an alkyl group as defined above.

Each ligands of the second category can thus be used as Ligand 2 in the ion-exchangers provided the ligand comprises one or more atoms which enables electron donor-acceptor interactions and/or hydrophobic interactions. Examples of atoms and/or groups that may be present are: aryls that may be substituted or unsubstituted including phenyl groups, pure alkyl and pure alkylene ($C_3$ and higher with preference for less than $C_8$), thioether, ether, uncharged amino, hydroxy, amido (carboxamido including sulphonamido, carbamido, carbamate etc), nitro, sulphone, uncharged carboxy etc. In this kind of ligands, two or more $sp^3$-hybridised carbon atoms linked directly together often separate the atoms or groups from each other.

The different ligands in stochastic ion-exchangers may be present more or less at random in relation to each other in the support matrix or in a part thereof. Depending on the method of introduction the ratio between the amounts of the ligands may vary but should always be 0.01–100, with preference for 0.02–50, for at least two ligands in a substantial part of the matrix. In order to accomplish uneven or layered distribution of different ligands within a support, the general principals outlined In WO 9839364 (Amersham Pharmacia Biotech AB) can be used. Due care has to be taken with respect to values of reactivity, diffusivity and concentration of ligand-forming reagents so that the sharp layers that are the primary goal in these two patent publications are not introduced. WO 9839364 is hereby incorporated by reference.

Particularly interesting stochastic ion exchangers comprise as Ligand 1 a strong ion-exchange ligand and as Ligand 2 a ligand can be charged/decharged by a switch in pH. Two typical combinations are:

(a) a strong cation-exchange ligand as Ligand 1 combined with a weak anion-exchange ligand as Ligand 2, or (b) a strong anion-exchange ligand as Ligand 1 and a weak cation-exchange ligand as Ligand 2.

In this context a strong cation-exchange ligand has a corresponding acid with a pKa<3–4. Examples of strong anion-exchange ligands are quaternary ammonium ligands and anion-exchange ligands having a pKa>10, such as $\geq 11$ or $\geq 12$. Other kinds of ion-exchange ligands are considered weak.

Other interesting combinations are for instance stochastic Ion-exchangers having two different weak anion- or cation-exchange ligands of similar pKa on the same base matrix, or a weak anion- and a weak cation-exchange ligand bound to the same matrix. The ligands can be selected such that the difference in pKas is less than, larger than or equal to two, three or four pH-units.

The largest advantages with combining ligands of different kind concern desalting of amphoteric substances. The ligands are typically combined in such a way that one of the ligands is charged (Ligand 1) while the other one (Ligand 2) is uncharged during step (i) and capable of becoming charged with the same charge as the substance to be released during step (ii). It follows that the proper combination will depend on the isoelectric point (pI) of the substance to be desalted. See further below.

Support Matrix/Base Matrix

The support matrix comprises the base matrix and any spacer attaching a ligand to the base matrix.

The base matrix is based on organic and/or inorganic material.

The base matrix is preferably hydrophilic and in the form of a polymer, which is insoluble and more or less swellable in water. Hydrophobic polymers that have been S derivatized to become hydrophilic are included in this definition. Suitable polymers are polyhydroxy polymers, e.g. based on polysaccharides, such as agarose, dextran, cellulose, starch, pullulan, etc. and completely synthetic polymers, such as polyacrylic amide, polymethacrylic amide, poly(hydroxyalkylvinyl ethers), poly(hydroxyalkylacrylates) and polymethacrylates (e.g. polyglycidylmethacrylate), polyvinyl alcohols and polymers based on styrenes and divinylbenzenes, and copolymers in which two or more of the monomers corresponding to the above-mentioned polymers are included. Polymers, which are soluble in water, may be derivatized to become insoluble, e.g. by cross-linking and by coupling to an insoluble body via adsorption or covalent binding. Hydrophilic groups can be introduced on hydrophobic polymers (e.g. on copolymers of monovinyl and divinylbenzenes) by polymerisation of monomers exhibiting groups which can be converted to OH, or by hydrophilization of the final polymer, e.g. by adsorption of suitable compounds, such as hydrophilic polymers.

Suitable inorganic materials to be used in base matrices are silica, zirconium oxide, graphite, tantalum oxide etc.

Preferred matrices lack groups that are unstable against hyrolysis, such as silan, ester, amide groups and groups present in silica as such. This in particular applies with respect to groups that are in direct contact with the liquids used.

The matrix may be porous or non-porous. This means that the matrix may be fully or partially permeable (porous) or completely impermeable to the substance to be removed (non-porous), i.e. the matrix should have a Kav in the interval of 0.40–0.95 for substances to be removed. This does not exclude that Kav may be lower, for instance down to 0.10 or even lower for certain matrices, for instance having extenders. See for instance WO 9833572 (Amersham Pharmacia Biotech AB).

In a particularly interesting embodiment of the present invention, the matrix is in the form of irregular or spherical particles with sizes in the range of 1–1000 µm, preferably 5–50 µm for high performance applications and 50–300 µm for preparative purposes.

Alternatively the matrix may be monolithic, such as a wall in a tube or in some other kind of vessel, a porous plug, a porous membrane or a filter.

The matrix may be in form of beads/particles with a density, which is larger than the liquid used in step (i). This kind of matrices is especially applicable in large-scale operations for fluidised or expanded bed chromatography as well as for different batch wise procedures, e.g. in stirred tanks. Fluidised and expanded bed procedures are described in WO 9218237 (Amersham Pharmacia Biotech AB) and WO 9200799 (Kem-En-Tek).

The term hydrophilic matrix means that the accessible surface of the matrix is hydrophilic in the sense that aqueous liquids are able to penetrate the matrix. Typically the accessible surfaces on a hydrophilic base matrix expose a plurality of polar groups for instance comprising oxygen and/or nitrogen atoms. Examples of such polar groups are hydroxyl, amino, carboxy, ester, ether of lower alkyls (such as $(-CH_2CH_2O-)_nH$ where n is an integer).

The spacer starts at the base matrix and extends to the ligand as defined above.

The spacer as such is conventional as in traditional ion-exchangers and may thus comprise linear, branched, cyclic saturated, unsaturated and aromatic hydrocarbon groups (e.g. with up to 1–20, such as 1–10 carbon atoms) as discussed above. These groups may comprise pure hydrocarbon groups of the type discussed above, hydroxy groups, alkoxy and aryloxy and the corresponding thio analogues, and/or amino groups. Carbon chains in hydrocarbon groups may at one or more positions be interrupted by ether oxygen and thioether sulphur. There may also be carbonyl groups, such as in amide and ketone groups, and other groups having the comparable stability against hydrolysis. At most one atom selected from oxygen, sulphur and nitrogen is preferably bound to one and the same $sp^3$-hybridised carbon atom.

It is apparent that the spacer may provide one or more electron donor or acceptor atoms or groups enhancing binding of the desired substance to the ion-exchanger as discussed above, for instance by participating in hydrogen-bonding. For reason of simplicity, this kind of atoms or groups is considered part of the spacer. There may also be attached more than one ligand to one and the same spacers. See "branches" above.

Ligand Density

The level of the ion-exchange ligands of the adsorbents used in the invention is usually selected in the interval of 0.001–4 mmol/ml of the matrix, such as 0.002–0.5 mmol/mL of the matrix, with preference for 0.005–0.3 mmol/ml of the matrix. Preferred ranges are among others determined by the kind of matrix, kind of ligand, substance to be adsorbed etc. The expression "mmol per ml of the matrix" refers to fully sedimented matrices saturated with water. The ligand density range refers to the capacity of the matrix in fully protonated/charged form to bind common counterions such as sodium ions and/or chloride ions and depends on the kind of anionic and/or cationic ligands that is present, among others.

Best Mode

The best mode variants of the invention vary with the substance of interest. The best modes so far discovered are presented in the experimental part.

Stability of the Ion-exchangers Used

The ion-exchangers/anion-exchange ligands used in the invention should withstand the conditions typically applied in processes comprising ion-exchange adsorptions. As a general rule, this means that an adsorbent according to the invention should be able to resist 0.1 or 1 M NaOH in water for at least 10 hours with essentially no reduction in total ion binding capacity. By "essentially no reduction in total ion binding capacity" is contemplated that the total ion binding capacity is reduced at most by 10%. This means that the ion-exchange ligand and the bas matrix should only contain structures selected among pure hydrocarbon groups (including homoaromatic and heteroaromatic structures), thioether and ether groups (including acetal and ketal groups), hydroxy groups, sulphone groups, carboxamide groups, sulphone amide groups, and groups of similar hydrolytic stability.

Adsorption/Desorption

The adsorption and/or desorption steps may be carried out as a chromatographic procedure with the anion-exchange matrix in a monolithic form or as particles in the form of a packed or a fluidised bed. For particulate matrices, these steps may be carried out in a batch-wise mode with the particles being more or less completely dispersed in the liquid.

The liquids used in steps (i) and (ii) are aqueous, i.e. water, possibly mixed with a water-miscible solvent.

Adsorption

During adsorption, a liquid sample containing the charged substance is contacted with the ion-exchanger defined above under conditions permitting adsorption (binding), preferably by ion-exchange. In other words the substance carries at least one group or atom that is oppositely charged compared to the ligand having the strongest tendency to be charged during the adsorption step (i).

Preferably the net charge of the substance is opposite to the net charge of the ion-exchanger during step (i). For an amphoteric substance that is present in an aqueous liquid, anion-exchange conditions typically mean a $pH \geq pI-0.5$, preferably $pH \geq pI$, and cation-exchange conditions a $pH \leq pI+0.5$. preferably $pH \leq pI$.

One of the benefits of the invention is that it will be possible to carry out adsorption/binding also at elevated ionic strengths compared to what normally has been done for conventional ion-exchangers (e.g. the reference anion-exchangers as defined above). In absolute figures this means that adsorption according to the present invention may be performed at ionic strengths above or below 15 or 20 mS/cm. The ionic strength may exceed 30 mS/cm and in some cases even exceed 40 mS/cm. Useful ionic strengths often correspond to NaCl concentrations (pure water) $\geq 0.1$ M, such as $\geq 0.3$ M or even $\geq 0.5$ M. The conductivity/ionic strengths to be used will depend on the ligands combined, their densities on the matrix, the substance to be bound and its concentration etc.

Desorption

The desorption process should comprise at least one of the following procedures:
(A) increasing the salt concentration (ionic strength);
(B) altering the pH in order to loosen the interaction between the desired substance and the ligands;
(C) Adding a ligand analogue or an agent (e.g. a solvent) that reduces the polarity of the aqueous liquid (I).

Item (B) may include (a) diminishing the charge on ligands that bind via ion-ion attractive interaction to the desired substance; and (b) diminishing the charge of a group on the desired substance that binds to a ligand having the opposite charge. The change in pH can many times be taken so that the ligand and the substance will have the same charge during step (ii).

The conditions provided by (A)–(C) may be used in combination or alone. The proper choice will depend on the particular combination of
(1) substance to be desorbed,
(2) ion-exchanger (ligands, kind of matrix, spacer and ligand density), and
(3) various variables of aqueous liquid II (composition, polarity, temperature, pH etc).

Replacing aqueous liquid (I) (adsorption buffer) with aqueous liquid (II) (desorption buffer), thus means that at least one variable such as temperature, pH, polarity, ionic strength, content of soluble ligand analogue etc shall be changed while maintaining the other conditions unchanged so that desorption can take place.

In the simplest cases this means:
(a) an increase in ionic strength and/or
(b) a change in pH as outlined above when changing from aqueous liquid I to aqueous liquid II. Alternative (a) includes a decreased, a constant or an increased pH. Alternative (b) includes a decreased, an increased or a constant ionic strength.

In chromatographic and/or batch procedures the matrix with the substance to be desorbed is present in a column or other suitable vessel in contact with liquid (I). The conditions provided by the liquid are then changed as described above until the desired substance is eluted from the matrix. A typical desorption process means that the ionic strength is increased compared to that used during adsorption and in many cases corresponds to at least 0.4 M NaCl, such as at 0.6 M NaCl, if none of the other variables are changed. The actual ionic strength value for elution/desorption may in preferred cases be lower and will depend on the various factors discussed above. If the ligands are properly selected it may suffice with a change in pH in order to change the net charge of the ligands and/or of the substance such that they are of opposite kind. This implies the possibility of reducing the salt concentration to be essentially the same as the concentration of the buffer used.

The requirement for using an increased ionic strength for desorption may be less strict depending on the conditions provided by aqueous liquid II. See below.

The change from liquid (I) to liquid (II) can be accomplished in one or more steps (step-wise gradient) or continuously (continuous gradient). The various variables of the liquid in contact with the matrix may be changed one by one or in combination.

Typical salts to be used for changing the ionic strength are selected among chlorides, phosphates, sulphates etc of alkali metals or ammonium ions).

The buffer components to be used for changing pH are dependent upon the kind of ligands involved and are typically the same as during the adsorption step. For instance, if the ion-exchange ligand is cationic the buffering acid base pair is preferably selected amongst acid-base pairs in which the buffering components can not bind to the ligand, i.e. buffers based on piperazine, 1,3-diaminopropane, ethanolamine etc. In an analogous fashion, the buffering acid-base pair in the case the ion-exchange ligand is anionic is phosphate, citrate, acetate, etc.

Desorption may also be assisted by adjusting the polarity of liquid (II) to a value lower than the polarity of the adsorption liquid (I). This may be accomplish d by including a water-miscible and/or less hydrophilic organic solvent in liquid II.

Examples of such solvents are acetone, methanol, ethanol, propanols, butanols, dimethyl sulfoxide, dimethyl formamide, acrylonitrile etc. A decrease in polarity of aqueous liquid II (compared to aqueous liquid I) is likely to assist in desorption and thus also reduce the ionic strength needed for release of the substance from the matrix.

Desorption may also be assisted by including a soluble structural analogue of one or more of the ligands used. The concentration of a structural analogue in liquid (II) should be larger than its concentration in aqueous liquid (I). A "structural analogue of the ligand" or a "ligand analogue" is a substance that has a structural similarity with the ligand and in soluble form is capable of inhibiting binding between the ligand and the substance to be removed.

Important Variants.

Variant 1: Ligand 1 is a cation-exchange ligand that has a pH-dependent negative charge and ligand 2 is either unchargeable or a chargeable base for which a significant portion is uncharged at the pH of step (i). pKa of the acid corresponding to ligand 1 is lower than pKa of the acid corresponding to ligand 2 (if chargeable). The substance to be adsorbed has a pl, which is above pKa of ligand 2. The pH of liquid (I) is selected such that the substance has a net positive charge, i.e. will adsorb to the ion-exchanger. By decreasing the pH, the substance and possibly also ligand 2 will be protonated and receive an increased positive charge. This will assist the release of the substance at a moderate pH and will permit desorption at a lowered salt concentration in liquid (II).

Variant 2: Ligand 1 comprises an anion-exchange ligand that has a pH dependent positive charge and ligand 2 is either completely unchargeable or a chargeable acid form for which a significant portion is uncharged at the pH of the step (i). The pKa of the ligand 2 is higher than the pKa of the ligand 1. The pl of the substance to be adsorbed (desalted) is below both pKa of ligand 1 and pKa of ligand 2. The pH of liquid (I) (step (i)) is such that substance has a net negative charge and ligand 1 a positive charge while ligand 2 is essentially uncharged. The substance thus will be adsorbed in step (i). By increasing the pH, ligand 2 will become negatively charged meaning desorption of the substance at a lowered salt concentration in liquid (II).

Recovery

In a sub-aspect the present inventive method enables high recoveries of an adsorbed substance, for instance recoveries above 60% such as above 80% or above 90%. Recovery is the amount of the desorbed substance compared to the amount of the substance applied to an ion-exchanger in the adsorption/binding step. In many instances, the recovery can exceed even 95% or be essentially quantitative according to the inventive merits of the invention. Typically the amount of the substance applied to the ion-exchanger is in the interval of 10–80%, such as 20–60%, of the total binding capacity of the ion-exchanger for the substance.

The Substance to be Removed from the Liquid (I).

The present invention is primarily intended for large molecular weight substances that have several structural units that can interact with the ligands defined above. Appropriate substances have a molecular weight that is above 1000 Dalton, and is bio-organic and polymeric. The number of charged groups per molecule is typically one or more and depends upon pH. Further comments concerning the molecular weight and the number of charges are given under the heading. "Technical Field". The substances may be amphoteric. The substances typically comprise a structure selected amongst peptide structure (for instance oligo- or polypeptide structure), nucleic acid structure, carbohydrate structure, lipid structure, steroid structure, amino acid structure, nucleotide structure and any other bio-organic structure that is charged or can be charged by a pH-switch.

The substance may be dissolved in the aqueous medium or be in the form of small bio-particles, for instance of colloidal dimensions. Illustrative examples of bio-particles are viruses, cells (including bacteria and other unicellular organisms) and cell aggregates and parts of cells including cell organelles.

It is believed that the invention in particular will be applicable to aqueous liquids that are derived from biological fluids comprising a substance of interest together with high concentrations of salts.

Typical liquids of high ionic strength that contain bio-organic substances of the kind discussed above are fermentation broths/liquids, for instance from the culturing of cells, and liquids derived therefrom. The cells may originate from a vertebrate, such as a mammal, or an invertebrate (for instance cultured insect cells such as cells from butterflies and/or their larvae), or a microbe (e.g. cultured fungi, bacteria, yeast etc). Included are also plant cells and other kinds of living cells, preferably cultured.

In the case liquid (I) also contains undesirable particulate matter then it may be beneficial to utilise expanded bed technology. This particularly applies when liquid (I) originates from (a) a fermentation broth/liquid from the culture of cells, (b) a liquid containing lysed cells, (c) a liquid containing cell and/or tissue homogenates, and (d) pastes obtained from cells.

The ion exchangers described herein are particularly well adapted for the manufacture of aqueous compositions containing bio-organic substances which have reduced concentrations of salt compared to an aqueous starting composition which is high in the concentration of salt. This kind of processes means desalting of the substance in question. See further our SE patent application filed in parallel with this application and having the title "A method for the manufacture of compositions containing a low concentration of salt".

The Second Aspect of the Invention

This aspect comprises an ion-exchange adsorbent (1) which is selected amongst ion-exchange adsorbents that are characterised by comprising a support matrix which is functionalised with at least two different ligands (ligand 1, ligand 2) for which at least one ligand has a charge which may or may not be pH-dependent Ligand 1 is charged and can be of the single or mixed mode ion-exchange kind. Ligand 1 thus may or may not contain neutral groups that enable the ligand to participate in van der Waals interactions and/or electron donor-acceptor interactions. The atoms and/or groups involved are the same as defined above for the first aspect of the invention.

Ligand 2 may be neutral or charged. If charged the charged atom or group of the ligand is typically of a different kind compared to the charged atom or group of ligand 1. For relevant differences, see the first aspect of the invention. A charged ligand may in the same manner as ligand 1 be a single mode or a mixed mode ligand. Independent of being charged or not charged, ligand 2 may comprise uncharged groups and/or atoms that enable the ligands to participate in hydrophobic interactions and/or electron donor-acceptor interactions as discussed for ligand 1 above and for the first aspect of the invention.

The ion-exchanger of this aspect is further characterised in that it for at least one reference substance selected amongst ovalbumin, conalbumin, bovine serum albumin, β-lactglobulin,α-lactalbumin, lysozyme, IgG, soybean trypsin inhibitor (STI):

(A) is capable of binding said at least one reference substance in an aqueous reference liquid having an ionic strength corresponding to 0.25 M NaCl; and (B) has a maximal breakthrough capacity for said at least one reference substance which in the subinterval of the pH interval 2–12, where the substance has a net charge opposite to a charged ligand, which is $\geq 100\%$, such as $\geq 200\%$ or $\geq 300\%$ or $\geq 500\%$ or $\geq 1000\%$, of the breakthrough capacity of said at least one substance on
  (a) Q Sepharose Fast Flow (ion-exchanger 2a), when the net charge of the substance is negative and the net charge of the ion-exchange adsorbent is positive, and/or
  (b) SP Sepharose Fast Flow (ion-exchanger 2b), when the net charge of the substance is positive and the net charge of the ion exchange adsorbent is negative.

The aqueous reference liquid in principle contains NaCl, buffer components and the substance of interest carrying the charge. Q Sepharose Fast Flow and SP Sepharose Fast Flow are given under the first aspect of the invention.

The comparisons above refer to measurements performed under essentially the same conditions for ion-exchanger (1) and (2a) or for ion-exchanger (1) and (2b), i.e. pH, temperature, solvent composition, counter-ions, and flow velocity are the same. Breakthrough capacities are measured at the same relative concentration of the substance in the flow through (for instance $c/c_0=10\%$, for $c/c_0$ see the experimental part).

Typically the breakthrough capacity (10% in the flow through at a flow rate of 300 cm/h) for at least one, two, three or more of the reference substances for an ion-exchanger of this aspect of the invention is >2 mg/ml gel such as >3 or 4 mg/ml gel.

The various embodiments and their preferences are the same as for the ion-exchanger defined for the first aspect of the invention.

The invention will now be illustrated with patent examples. The invention is further defined in the appending claims.

EXPERIMENTAL

1. Synthesis of Stochastic Ion-Exchange Adsorbents

General:

Volumes of matrix refer to settled bed volume. Weights of matrix given in gram refer to suctioned dry weight. For large-scale reactions, stirring performed with a motor-driven stirrer. Small-scale reactions (up to 20 ml of gel) were performed in closed vials on a shaking table. Determination of the degrees of allylation, epoxidation, substitution of ion-exchanger groups on the beads was performed with conventional methods. If needed elementary analysis of the gels in particular for sulphur was carried out.

The synthesised ion-exchange adsorbents had Sepharose 6 Fast Flow (APBiotech AB, Uppsala, Sweden) as the base matrix.

1.1 Introduction of Allyl Groups on Phenyl Sepharose 6 Fast Flow

Allylation was carried out with allyl glycidyl ether. There are also other alternative routes, e.g. reaction with allyl bromide.

1.1.1. Introduction of Allyl Groups on Phenyl Sepharose 6 Fast Flow (Low-substituted, 20 µmol Phenyl/ml of Gel).

a) Low Degree of Allyl Substitution.

50 g (50 ml drained gel) of Phenyl Sepharose 6 Fast Flow (Low-substituted 20 µmol phenyl/ml of gel) in 10 ml water were mixed with 20 ml of an aqueous solution containing NaOH (50%), 0.2 g of $NaBH_4$ and 6.5 g of $Na_2SO_4$. The mixture was stirred for 1 hour at 50° C. After addition of 7 ml of allylglycidyl ether the suspension was left at 50° C. under vigorous stirring for an additional 18 hours. After filtration of the mixture, the gel was washed successively, with 5×50 ml of distilled water, 5×50 ml of ethanol, 2×50 ml of distilled water, 2×50 ml of 0.2 M acetic acid and, 5×50 ml of distilled water. The degree of substitution was 0.13 mmol of allyl/ml of gel.

b) Medium Degree of Allyl Substitution.

The procedure was the same as in 1.1.1.a except that 28 ml of allylglycidyl ether were used. The degree of substitution was 0.22 mmol of allyl/ml of gel.

c) High Degree of Allyl Content.

The procedure was the same as in 1.1.1.a except that 50 ml of allylglycidyl ether were used. The degree of substitution was 0.4 mmol of allyl/ml of gel.

1.1.2. Introduction of Allyl Groups on Phenyl Sepharose 6 Fast Flow (High-substituted, 40 µmol of Phenyl/ml).

a) Low Degree of Allyl Content.

50 g (50 ml drained gel) of Phenyl Sepharose 6 Fast Flow (high-substituted, 40 µmol of phenyl/ml of gel) in 10 ml of water were mixed with 20 ml of an aqueous solution containing NaOH (50%), 0.2 g of $NaBH_4$ and 6.5 g of $Na_2SO_4$. The mixture was stirred for 1 hour at 50° C. After addition of 7 ml of allylglycidyl ether the suspension was left at 50° C. under vigorous stirring for an additional 18 hours. After filtration of the mixture, the gel was washed successively, with 5×50 ml of distilled water, 5×50 ml of ethanol, 2×50 ml of distilled water, 2×50 ml of 0.2 M acetic acid and, 5×50 ml of distilled water. The degree of substitution was 0.17 mmol of allyl/ml of gel.

b) Medium Degree of Allyl Content.

The procedure is the same as in 1.1.2.a except that 28 ml of allylglycidyl ether were used. The degree of substitution was 0.22 mmol of allyl/ml of gel.

c) High Degree of Allyl Content.

The procedure is the same as in 1.1.2.a except that 50 ml of allylglycidyl ether were used. The degree of substitution was 0.4 mmol of allyl/ml of gel.

1.2. Preparation of Sulfopropyl Phenyl Sepharose 6 Fast Flow 1.2.1. Introduction of Sulfopropyl on Phenyl Sepharose 6 Fast Flow (Low-substituted, 20 μmol of Phenyl/ml).

a) From Intermediate Product Prepared Under 1.1.1.a. The Obtained Product is Designated as Cat3.

9 g of sodium disulfite were added to a slurry of 45 g (45 ml drained gel) of allyl low-substituted allyl (0.13 mmol of allyl/ml of gel) low-substituted Phenyl (20 μmol of phenyl/ml of gel) Sepharose 6 Fast Flow in 15 ml of water. The pH was adjusted to 6.5 by addition of an aqueous solution of NaOH (50%). The reaction was maintained for 18 hours under stirring at room temperature with a slow air bubbling. After filtration of the mixture, the gel was washed successively, with 4×50 ml of distilled water, 2×50 ml of 0.5 M HCl and, 3×50 ml of 1 mM HCl. The degree of substitution was 0.12 mmol of sulfopropyl/ml of gel.

b) From Intermediate Product Prepared Under 1.1.1.b. The Obtained Product is Designated as Cat4.

The procedure is the same as in 1.2.1.a except that the degree of substitution of allyl was 0.22 mmol/ml of gel and the reaction time was 17 hours. The degree of substitution was 0.18 mmol of sulfopropyl/ml of gel.

1.2.2. Introduction of Sulfopropyl on Phenyl Sepharose 6 Fast Flow (High-substituted, 40 μmol of Phenyl/ml of Gel).

a) From Intermediate Product Prepared Under 1.1.2.a. The Obtained Product is Designated as Cat1.

The procedure is the same as in 1.2.1.a except that the allyl content was 0.17 mmol allyl/ml of gel and Phenyl Sepharose 6 Fast Flow (high-substituted, 40 μmol of phenyl/ml of gel) was used. The degree of substitution was 0.12 mmol sulfopropyl/ml of gel.

b) From Intermediate Product Prepared Under 1.1.2.b. The Obtained Product is Designated as Cat2.

The procedure was the same as in 1.2.1.a except that the allyl content was 0.22 mmol of allyl/ml of gel and Phenyl Sepharose 6 Fast Flow (high-substituted, 40 of μmol phenyl/ml of gel) was used. The degree of substitution was 0.15 mmol sulfopropyl/ml of gel.

1.3. Activation of Allylated Phenyl Sepharose 6 Fast Flow.

Bromine was added to a stirred suspension 50 ml of allylated Phenyl Sepharose 6 Fast Flow (0.4 mmol of allyl/ml of gel), 50 ml of distilled water and 2 g of sodium acetate until a persistent yellow colour was obtained. Sodium formate was then added until the suspension was fully decolourised. The reaction mixture was filtered and the gel washed with 250 ml of distilled water. The activated gel was then transferred to a reaction vessel and further reacted with the appropriate ligand-forming compound.

1.4. Anion-exchangers Derived from Phenyl Sepharose 6 Fast Flow 1.4.1. Introduction of an Amine Ligand Derived from 1,3-Diaminopropane on Phenyl Sepharose 6 Fast Flow.

a) From Intermediate Product Prepared Under 1.1,2.c. The Obtained Product is Designated as An1.

5 ml of bromine activated allylated Phenyl Sepharose 6 Fast Flow (0.4 mmol of allyl/ml of gel; 40 μmol of phenyl/ml of gel) was transferred to a reaction vial containing 1,3-diaminopropane (7.5 ml, ligand-forming compound). The reaction was continued for 17 hours under stirring at 55° C. After filtration of the reaction mixture the gel was successively washed with 3×10 ml of distilled water, 3×10 ml of aqueous 0.5 M HCl and finally 3×10 ml of distilled water. The degree of substitution was 0.24 mmol of ion-exchange ligand/ml of gel.

b) From Intermediate Product Prepared Under 1.1.1.c. The Obtained Product is Designated as An2.

The procedure is the same as in 1.4.1.a except that allylated Phenyl Sepharose 6 Fast Flow (0.4 mmol of allyl/ml of gel, 20 μmol of phenyl/ml of gel) was used. The degree of substitution was 0.25 mmol of ion-exchange ligand/ml of gel.

1.4.2. Introduction of an Amine Ligand Derived from 1,3-Diamino-2-hydroxy Propane on Phenyl Sepharose 6 Fast Flow.

a) From Intermediate Product Prepared Under 1.1.2.c. The Obtained Product is Designated as An3.

The procedure is the same as for 1.4.1 except that allylated Phenyl Sepharose 6 Fast Flow (0.4 mmol of allyl/ml of gel, 40 μmol of phenyl/ml of gel) and solution of 1,3-diamino-2-propanol (3 g) in distilled water (1,5 ml) instead of 1,3-diaminopropane were used. The degree of substitution was 0.16 mmol of ion-exchange ligand/ml of gel.

b) From Intermediate Product Prepared Under 1.1.1.c. The Obtained Product is Designated as An4.

The procedure is the same as for 1.4.2.a except that allylated Phenyl Sepharose 6 Fast Flow (0.4 mmol of allyl/ml of gel, 40 μmol of phenyl/ml of gel) was used. The degree of substitution was 0.16 mmol of ion-exchange ligands/ml of gel.

1.5. Cation-exchangers Derived from Phenyl Sepharose 6 Fast Flow 1.5.1. Introduction of a Carboxy Ligand Derived from Mercaptopropionic Acid on Phenyl Sepharose 6 Fast Flow.

a) From Intermediate Product Prepared Under 1.1.1.c. The Obtained Product is Designated Cat5.

100 ml of bromine activated allylated Phenyl Sepharose 6 Fast Flow (0.42 of mmol allyl/ml of gel, 40 μmol of phenyl/ml of gel) was transferred to a reaction vessel and treated with an aqueous solution (50 ml of distilled water) of 17.5 ml of mercaptopropionic acid (6 equivalents per allyl group) and 12 g of NaCl. Before the addition, the pH was adjusted to 11.5 with 50% aq. NaOH. The reaction was continued for 18 hours under stirring at 50° C. Filtration of the reaction mixture and washing with 500 ml of distilled water gave the cation-exchange gel. The degree of substitution was 0.27 mmol of $CO_2H$ ligands/ml of gel.

b) From Intermediate Product Prepared Under 1.1.1.c. The Obtained Product is Designated Cat5.

The procedure was the same as in 1.5.1.a except that allylated Phenyl Sepharose 6 Fast Flow (0.41 mmol of allyl/ml of gel, 20 μmol of phenyl/ml of gel) was used and the batch size was 50%. The degree of substitution was 0.28 mmol $CO_2H$ ligands/ml of gel.

1.6. Introduction of a Carboxy Ligand Derived from Mercaptopropionic Acid and a Pyridyl Ligand Derived from 2-Mecaptopyridine on Sepharose 6 Fast Flow.

1.6.1. Preparation of Allylated Sepharose 6 Fast Flow.

80 g of Sepharose 6 Fast Flow was mixed with 0.5 g of $NaBH_4$, 13 g of $Na_2SO_4$ and 50 ml of 50% aqueous solution of NaOH. The mixture was stirred for 1 hour at 50° C. After addition of 100 ml of allylglycidyl ether the suspension was left at 50° C. under vigorous stirring for an additional 18 hours. After filtration of the mixture, the gel was washed successively, with 500 ml of distilled water, 500 ml of ethanol, 200 ml of distilled water, 200 ml of 0.2 M acetic acid and, and 500 ml of distilled water. The degree of substitution was 0.41 mmol of allyl/ml of gel.

1.6.2. Activation of Allylated Sepharose 6 Fast Flow by Bromination

This was performed as described in section 1.3 above with exception that allylated Sepharose 6 Fast Flow was used.

1.6.3. Synthesis of Sepharose 6 Fast Flow Substituted with a Pyridyl Ligand Derived from 2-Mecaptopyridine (Low Sub) and a Carboxy Ligand Derived from Mercaptopropionic Acid. The Product is Designated as CatAn1.

In a reaction vial, the pH of a solution of 0.5 mmol of 2-mercaptopyridine in 5 ml of 0.5 M sodium bicarbonate was adjusted to pH 10.5 by adding a 50% aqueous solution of NaOH. Separately, a solution of 1.2 g of 3-mercaptopropionic acid in 1 ml of distilled water was prepared and its pH adjusted to 11 by adding a 50% aqueous solution of NaOH. To the vial containing the solution of 2-mercaptopyridine, 10 ml of bromine-activated allyl Sepharose 6 Fast Flow (0.41 mmol of allyl/ml of gel) was added and the reaction continued under stirring at 50° C. After 1.5 hours the solution containing 3-mercaptopropionic acid was added and the mixture was stirred at 45° C. for 16 hours. The reaction mixture was filtered and the gel washed with 5×10 ml of distilled water. Microanalysis gave a degree of substitution of 43 μmol/ml of gel for the pyridine ligand and 251 μmol/ml of gel for the propionic acid ligand.

1.6.4. Synthesis of Sepharose 6 Fast Flow Substituted with a Pyridyl Ligand Derived from 2-Mercaptopyridine (Medium Sub) and a Carboxy Ligand Derived from Mercaptopropionic Acid. The Product is Designated as CatAn2.

The procedure was the same as in 1.6.3 except that the amount of 2-mercaptopyridine was doubled. Microanalysis gave a degree of substitution of 86 μmol/ml of gel for the pyridine ligand and 215 μmol/ml of gel for the propionic acid ligand.

1.6.5. Synthesis of Sepharose 6 Fast Flow Substituted with a Pyridyl Ligand Derived from 2-Mercaptopyridine (High Sub) and a Carboxy Ligand Derived from Mercaptopropionic Acid. The Product is Designated as CatAn3.

The procedure was the same as in 1.6.3 except that the amount of 2-mercaptopyridine was trebled. Microanalysis gave a degree of substitution of 127 μmol/ml of gel for the pyridine ligand and 171 μmol/ml of gel for the propionic acid ligand.

2. Chromatography 2.1. Mixed-ligand Cation-exchange Media

Three purified proteins [representing basic (lysozyme=Lys), neutral to weakly basic (IgG) and acidic (BSA) proteins] were used to characterise the new series of "high salt" mixed-ligand cation-exchange media with respect to their breakthrough capacities ($Qb_{10\%}$). The binding and elution of lysozyme was done with normal cation-exchange operating procedures, i.e. adsorption at neutral pH and elution with buffer containing a high concentration of salt (e.g. 2 M NaCl) at the same pH. The IgG was bound at pH 4.5 and eluted with buffer of pH 7.0 containing relatively low salt concentration (0.1 M). IgG was bound at low pH because a significantly higher amount could be adsorbed to the various media at low pH than at high pH. BSA was bound at pH 4.0 where it is positively charged (pI of BSA=4.9) and eluted by raising the pH to 7.0, as in the case of IgG. Furthermore, the elution conductivities of three basic proteins (i.e. ribonuclease, cytochrome C and lysozyme) were also determined for all of the mixed-ligand cation-exchange media. The procedures used to determine breakthrough capacities and elution conductivity for the new series of "high salt" mixed-ligand cation-exchange media are outlined below.

2.1.1. Breakthrough Capacity ($Qb_{10\%}$) at "High Salt" Conditions

One of the main criteria that qualifies a mixed-ligand cation-exchange medium as a "high salt" medium is its binding capacity for proteins in the presence of relatively high concentrations of salt compared with that of a reference cation-exchanger that is operated under identical conditions. This breakthrough capacity is determined using the method of frontal analysis as described below.

2.1.2. Experimental

Buffer Solutions

Buffer 1: 20 mM sodium phosphate, 0.3 M sodium chloride, pH 6.8

Buffer 2: 20 mM sodium acetate, 0.25 M sodium chloride, pH 4.0

Buffer 3: 20 mM sodium acetate, 0.25 M sodium chloride, pH 4.5

Buffer 4. 20 mM sodium phosphate, 2 M sodium chloride, pH 6.8

Buffer 5: 100 mM sodium phosphate, pH 7.0

Protein Solutions
1. Lysozyme: 4 mg/mL in Buffer 1
2. BSA: 4 mg/mL in Buffer 2
3. IgG: 4 mg/mL in Buffer 3

All buffers and protein solutions were filtered through 0.45 μm Millipore Millex HA filters before use.

2.1.3. Chromatography System

All experiments were performed at room temperature using Äkta Explorer 100 chromatography system equipped with Unicorn 3.1 software (Amersham Pharmacia Biotech AB, Uppsala, Sweden). Samples were applied to the columns via a 150 mL superloop. The effluents were monitored continuously by absorbance measurements at 280 nm using a 10 mm flow cell.

2.1.4. Frontal Analysis

Each prototype of the "high salt" mixed-ligand cation-exchange media was packed in an HR5/5 column (packed bed volume=1 mL) and equilibrated with a buffer of appropriate pH and salt concentration (Buffer 1, 2 or 3). The appropriate protein solution was continuously fed to the column at a flow rate of 1 mL/min (i.e. 300 cm/h). The application of the sample was continued until the $A_{280}$ of the effluent reached a level of 10% of the $A_{280}$ of the sample applied to the column. The maximum UV signal for the sample was estimated by pumping the test solution directly into the UV detector. On the basis of data so obtained (see equation 1), the breakthrough capacity ($Qb_{10\%}$) of the packed gel at a level of 10% of the concentration of the applied protein can be calculated. The results so obtained have formed the basis for the screening of a number of "high salt" mixed-ligand ion-exchange media and will be presented below for three proteins, viz. lysozyme, bovine serum albumin (BSA) and human immunoglobulin (IgG).

The breakthrough at a level of 10% of the maximum absorbance ($Qb_{10\%}$) was calculated using the following relationship:

$$Qb_{10\%}=(T_{R10\%}-T_{RD})\times C/V_c \qquad (1)$$

$T_{R10\%}$=retention time (min) at 10% of the maximum absorbance
$T_{RD}$=void volume of the system (min)
C=concentration of the feed protein (4 mg/mL)
$V_C$=packed bed volume of the column (mL)

2.1.5. Function Test

The mixed-ligand cation-exchange media were packed in 1.0 mL HR 5/5 columns and equilibrated with 20 column volumes of Buffer A (20 mM piperazin buffer; pH 6.0). 50 µl of a protein mixture (6 mg/mL Ribonuclease, 2 mg/mL Cytochrome C and 2 mg/mL Lysozyme) were applied to the column and eluted with a linear gradient (gradient volume=20 column volumes) to 100% of Buffer B (Buffer A plus 2.0 M NaCl). The flow rate was maintained to 0.3 mL/min (100 cm/h).

2.2. Mixed-ligand Anion-exchanger Media

To verify that the media suggested in this invention adsorb proteins at higher ionic strengths than the reference anion-exchanger, breakthrough capacities of bovine serum albumin (BSA) were determined. The new "high-salt" mixed-ligand media based on an anion-exchange ligand attached to Sepharose 6 Fast Flow were compared to Q Sepharose Fast Flow in this study. In addition, the recovery of BSA (the amount of adsorbed BSA that can be desorbed, see details below) was also studied. Furthermore, the elution conductivities of three proteins, namely conalbumin (Con A), lactalbumine (Lactalb) and soybean trypsin inhibitor (STI), were also determined for all anion-exchangers. This function test was also used to verify retardation at high salt conditions for other proteins as well.

2.2.1. Breakthrough Capacity ($Qb_{10\%}$) at High Salt Condition

The $Qb_{10\%}$-value was evaluated at relatively high concentration of salt (0.25 M NaCl) relative to the reference anion-exchanger Q Sepharose Fast Flow that was operated under identical conditions. The $Qb_{10\%}$-values for different anion-exchange media were determined using the method of frontal analysis described below.

A solution of BSA (4 mg/mL) was prepared in 20 mM piperazin (pH=6.0) containing 0.25 M NaCl. Buffer and sample solutions were filtered through 0.45 µm Millipore Millex HA filters before use and experiments were performed with the same equipment and instrumental settings as described in 2.1.3.

Each prototype mixed-ligand anion-exchange media was packed in a HR 5/5 column (packed bed volume=1 mL) and equilibrated with the piperazine buffer (20 mM piperazin, pH=6.0, with 0.25 M NaCl). The breakthrough capacity at a level of 10% of maximum absorbance of the BSA sample solution ($Qb_{10\%~BSA}$) was calculated according to the procedure in section 2.1.4.

2.2.2. Recovery

Details concerning type of column, packed bed volume, buffers, protein solution, flow rate and type of apparatus are outlined above. To a column equilibrated with piperazin buffer (20 mM piperazin, HCl, pH=6.0, 0.25 M NaCl), a solution of BSA was applied from a 50 mL super loop until an amount corresponding to 30% of its breakthrough capacity was applied. The column was then washed with two bed volumes of the equilibrium buffer and the bound BSA was eluted with the desorption buffer (20 mM piperazin, pH=6.0, 2.0 M NaCl). The amount of eluted BSA was calculated and the recovery of BSA was established using the following relationships:

The concentration of the eluted BSA was calculated according to equation 2.

$$C_S = \frac{A}{\varepsilon \cdot b} \qquad (2)$$

$C_S$=concentration of the eluted BSA sample (mg/mL)
A=Absorbance at 280 nm.
$\varepsilon$=molar absorbtivity at a specific wavelength, $M^{-1}~cm^{-1}$
b=path length, cm
Equation 3 was used for calculating the recovery of BSA $$\text{Recovery, }\% = \frac{C_S \cdot V_S}{C_L \cdot V_L} \qquad (3)$$

$V_S$=Volume of the eluted BSA solution, mL
$C_L$=Concentration of the applied BSA solution, mg/mL
$V_L$=Volume of the applied BSA solution, mL 2.2.3. Function Test The "high salt" mixed-ligand anion-exchange media were packed in HR 5/5 columns (1 mL bed volume) and equilibrated with 20 column volumes of the A-buffer (20 mM phosphate buffer; pH 6.8). 50 µl of a protein mixture (6 mg/mL Con A, 4 mg/mL Lactalbumin and 6 mg/mL STI) were applied to the column and eluted with a linear gradient (gradient volume=20 column volumes) to 100% of the B-buffer (A-buffer plus 2.0 M NaCl). The flow rate was maintained at 0.3 mL/min (100 cm/h).

2.3. Results 2.3.1. Breakthrough Capacity of Mixed-ligand Cation-exchange Media at High Salt Conditions and Elution Conductivity at Normal Cation-exchange Chromatographic Conditions The results obtained for breakthrough capacities for a series of representative "high salt" mix d-ligand cation-exchange media (see Table 1) are summarised in Table 2.

Table 1 shows some specific ligand properties of the various media used to exemplify some basic concepts of this invention. The ligand ratios of the majority of these new mixed-ligand cation-exchangers were in the interval of 3–14. As reference cation-exchangers, the commercially available Sulphopropyl (or SP) Sepharose 6 Fast Flow was used. Its ligand concentration is about 0.22 mmol/mL packed gel. The results (Table 2) indicate the following trends:

1. With one exception, the new cation-exchange ligands have a much higher $Qb_{10\%}$ for all three proteins compared to the reference cation-exchanger SP Sepharose Fast Flow.

2. CatAn3 gave the highest $Qb_{10\%}$ for Lys (54 mg/mL); Cat5 and Cat6 for HSA (45 mg/mL) and CatAn1 for IgG (26 mg/mL). These values correspond to an increase of 1300%, 1500% and 2600% for Lys, HSA and IgG, respectively, on the above four media relative to the reference cation-exchanger (SP Sepharose 6 Fast Flow).

3. Media Cat1, Cat2 and Cat3 have a much higher $Qb_{10\%}$ for BSA than for IgG. The results suggest that these media can be useful for removing BSA from IgG preparations.

4. The three media CatAn1–3 illustrate how the $Qb_{10\%}$-values of Lysozyme and IgG are related to the ligand ratio of the two mixed ligands (mercaptopropionic acid and mercaptopyridine). $Qb_{10\%Lys}$ increases and $Qb_{10\%}$ IgG decreases when the ligand ratio (ligand density of mecaptopropionic acid/ligand density of mercaptopyridine) decreases (Tables 1 and 2). The elution conductivity at normal cation-exchange chromatography of the three proteins (Table 2) also shows great variation in selectivity due to the ligand ratio of the media CatAn1–3.

2.3.2. Breakthrough Capacity of Mixed-ligand Anion-exchange Media at High Salt Conditions and Elution Conductivity at Normal Anion-exchange Chromatography The results obtained for breakthrough capacities for a series of representative "high salt" mixed-ligand anion-exchange media (An1–4) are summarised in Table 3 and the structures of the ligands are presented in Table 1. As a reference anion-exchanger, the commercially available Q Sepharose Fast Flow was used. The results indicate the following trends.

1. The new mixed-ligand anion-exchange media have much higher elution conductivity for all three proteins compared with the reference anion-exchanger Q Sepharose Fast Flow (Table 3).

2. The new anion-exchange ligands also have a much higher breakthrough capacity for BSA ($Qb_{10\%\ BSA}$) compared to Q Sepharose Fast Flow. The medium that gave the highest $Qb_{10\%}$-value corresponds to an increase of 2900% relative to the reference anion-exchanger. Of the media shown in table 3, the one that gave the lowest $Qb_{10\%}$-value displayed a 2200% increase compared to Q Sepharose Fast Flow.

3. The recovery data show that the adsorbed BSA can be eluted by a salt step with recoveries larger than 71% (Table 3).

TABLE 1

The type and ligand density ratios of various "high-salt" mixed-ligand ionexchange media.

| Medium | Ligand 1 | Ligand 2 | Ligand density ratio (Lig. 1/Lig. 2) |
|---|---|---|---|
| Cat1[a] | Sulphopropyl | Phenyl | 3.0 |
| Cat2[a] | Sulphopropyl | Phenyl | 3.8 |
| Cat3[b] | Sulphopropyl | Phenyl | 6.0 |
| Cat4[b] | Sulphopropyl | Phenyl | 9.0 |
| Cat5[a] | Mercaptopropionic acid | Phenyl | 6.8 |
| Cat6[b] | Mercaptopropionic acid | Phenyl | 14 |
| An1[a] | 1,3-Diaminopropane | Phenyl | 6.0 |
| An2[b] | 1,3-Diaminopropane | Phenyl | 13 |
| An3[a] | 1,3-Diamino-2-propanol | Phenyl | 4.0 |
| An4[b] | 1,3-Diamino-2-propanol | Phenyl | 9.0 |
| CatAn1[c] | Mercaptopropionic acid | Mercaptopyridine | R1 |
| CatAn2[c] | Mercaptopropionic acid | Mercaptopyridine | R2 |
| CatAn3[c] | Mercaptopropionic acid | Mercaptopyridine | R3 |

[a]These media were based on Phenyl Sepharose Fast Flow (high sub) with a ligand density of ca 40 µmol/mL medium
[b]These media were based on Phenyl Sepharose Fast Flow (low sub) with a ligand density of ca 20 µmol/mL medium
[c]The ligand ratio of these media decreases in the order: R1 > R2 > R3. See the section on coupling of ligands for more details.

TABLE 2

Elution conductivity at pH 6 for three proteins and breakthrough capacities of Lysozyme (pH 6.8 and 0.3 M NaCl), BSA and IgG (pH 4.0 and 0.25 M NaCl) on different "high-salt" mixed-ligand cation-exchange media.

| | Elution conductivity | | | Breakthrough capacity | | |
|---|---|---|---|---|---|---|
| Medium | Rib mS/cm | Cyt MS/cm | Lys mS/cm | $Qb_{10\% Lya}$ Mg/mL | $Qb_{10\% BSA}$ mg/mL | $Qb_{10\% IgG}$ mg/mL |
| SP FF[a] | 19 | 32 | 32 | 4 | 3 | 1 |
| Cat1 | 23 | 29 | 54 | 20 | 41 | 4 |
| Cat2 | 20 | 27 | 41 | 5 | 37 | 3 |
| Cat3 | 18 | 22 | 43 | 7 | 40 | 3 |
| Cat4 | 19 | 28 | 37 | 4 | 18 | 2 |
| Cat5 | 27 | 32 | 53 | 6 | 45 | 12 |
| Cat6 | 26 | 31 | 52 | 6 | 45 | 12 |
| CatAn1 | 26 | 35 | 60 | 23 | na | 26 |
| CatAn2 | 29 | 38 | 78 | 48 | na | 21 |
| CatAn3 | 31 | 41 | 132 | 54 | na | 20 |

[a]SP Sepharose 6 Fast Flow
na = not analyzed

TABLE 3

Elution conductivity at pH 6 for three proteins (Conalbumin, Lactalbumin and soybean trypsin inhibitor), breakthrough capacity of BSA (pH 6 and 0.25 M NaCl) and recovery of BSA on different "high-salt" mixed-ligand anion-exchange media.

| | Elution conductivity | | | Breakthrough capacity | Recovery |
|---|---|---|---|---|---|
| Medium | ConA mS/cm | Lactalb MS/cm | STI mS/cm | $Qb_{10\% BSA}$ mg/mL | BSA % |
| Q FF[a] | 12 | 20 | 30 | 1 | na |
| An1 | 31 | 55 | 79 | 22 | 90 |
| An2 | 30 | 54 | 78 | 23 | 85 |
| An3 | 32 | 54 | 86 | 29 | 86 |
| An4 | 32 | 53 | 84 | 28 | 71 |

[a]Q Sepharose Fast Flow
na = not analysed due to low $Qb_{10\%}$ -value

What is claimed is:

1. A method for the removal of a substance from an aqueous liquid by ion exchange, comprising the steps of:
   providing a liquid wherein said substance is present in a charged state;

providing an adsorption matrix which comprises at least two structurally different ligands, comprising at least one weak ion exchanger or at least one strong ion exchanger;

contacting the liquid with the matrix under a sufficient period of time to allow adsorption of the substance to the matrix; and adding an eluent that desorbs the substance from the matrix;

wherein each ligand interacts with the substance during the adsorption step and at least one of said ligands is charged and capable of ionic interaction with the substance.

2. The method of claim 1, wherein one charged ligand is a anion exchanger and the substance to be removed is initially negatively charged, the conditions for adsorption being defined by a pH>pI of the negatively charged substance and pH<pKa of the positively charged groups of the ligand.

3. The method of claim 2, wherein the adsorption capacity for the substance is ≧100% such as ≧200%, of the adsorption capacity of the same substance in a corresponding reference ion-exchanger in which essentially all of the charged groups are quaternary ammonium groups (q-groups).

4. The method of claim 2, wherein the desorption is performed by adding an eluent comprising an increasing ion-strength gradient.

5. The method of claim 1, wherein one charged ligand is a cation ion exchanger and the substance to be removed is initially positively charged, the conditions for adsorption being defined by a pH<pI of the positively charged substance and pH>pKa of the negatively acid corresponding to the ligand.

6. The method of claim 5, wherein the adsorption capacity for the substance is ≧100%, such as ≧200%, of the adsorption capacity of the same substance in a corresponding reference ion-exchanger in which essentially all charged groups are sulfopropyl group.

7. The method of claim 5, wherein the desorption is performed by adding an eluent comprising an increasing ionic strength.

8. The method of claim 1, wherein the adsorption is performed at an ionic strength higher than or equal to that of a water solution of 0.10 M NaCl, preferably 0.20 M NaCl or 0.30 M NaCl.

9. The method of claim 1, wherein the ligands are capable of binding the substance of interest in an aqueous reference liquid at an ionic strength corresponding to 0.25 M NaCl.

10. The method of claim 1, wherein at least one ligand interacts with the substance by hydrophobic and/or electron donor-acceptor interaction.

11. The method of claim 10, wherein said ligand is chargeable and desorption of the substance from the matrix is performed by a pH switch.

12. The method of claim 1, wherein the polarity of the eluent is lower than that of the aqueous liquid from which the substance is removed.

13. The method of claim 1, wherein at least one ligand is a mixed mode ligand comprising
  (a) a first mode site which gives charge-charge attractive interaction with the substance, and
  (b) a second mode site which gives charge-charge attractive interaction and/or hydrophobic interaction and/or electron donor-acceptor interaction with the substance.

14. The method of claim 1, which is for removal of a biopolymer structure from a liquid, which structure is selected from the group comprised of carbohydrate structures, peptide structures, peptide nucleic acid (PNA) structures and nucleic acid structures.

15. The method of claim 1, which is for removal of a biopolymer the charge of which is pH-dependent.

16. The method of claim 1, which is for removal of an amphoteric substance.

* * * * *